United States Patent Office.

OTTO SOHST, OF HÖCHST-ON-THE-MAIN, GERMANY, ASSIGNOR TO THE FARB-WERKE, VORMALS MEISTER, LUCIUS & BRÜNING, OF SAME PLACE.

BLACK AZO DYE AND PROCESS OF MAKING SAME.

SPECIFICATION forming part of Letters Patent No. 646,711, dated April 3, 1900.

Application filed March 9, 1899. Serial No. 708,395. (Specimens.)

*To all whom it may concern:*

Be it known that I, OTTO SOHST, Ph. D., a citizen of the Empire of Germany, residing at Höchst-on-the-Main, Germany, have invented certain new and useful Improvements in the Manufacture of new Monoazo Dyestuffs for Wool, of which the following is a specification.

In the French Patent No. 278,609 are described red to violet monoazo dyestuffs for wool obtained from acetylized amidonaphtholsulfonic acids. I have found that by combining these acetylized amidonaphtholsulfonic acids with diazotized picramic acid black dyestuffs for wool may also be obtained, which are characterized by the superior fastness of their tints. I have obtained good results particularly with 1:8:3:6 and 1:8:4:6 acetylamidonaphtholdisulfonic acids.

I illustrate my process by the following example: Picramic acid is diazotized in the usual manner and the diazo compound is introduced into a soda alkaline solution of an equivalent quantity of 1:8:3:6 acetylamidonaphtholdisulfonic acid. After standing for some hours the solution is salted out, pressed, and dried.

The dyestuff dyes wool black and may be developed to a dark olive green on treatment with chrome.

The dyes exhibit a much greater fastness to light than those obtained with the corresponding dyestuff from not acetylized amidonaphtholdisulfonic acid.

Having now described my invention, what I claim is—

1. The process for the manufacture of new monoazo-dyestuffs, which consists in combining diazotized picramic acid with acetylamidonaphtholsulfonic acids, substantially as described.

2. As a new product the dyestuffs obtained from diazotized picramic acid and acetylamidonaphtholsulfonic acid, being a dark powder, easily soluble in water and dyeing wool in black tints.

3. As a new product the dyestuff obtained from diazotized picramic acid and 1:8:3:6 acetylamidonaphtholdisulfonic acid, being a dark powder, easily soluble in water and dyeing wool in black tints.

In testimony that I claim the foregoing as my invention I have signed my name in presence of two subscribing witnesses.

OTTO SOHST.

Witnesses:
HEINRICH HAHN,
ALFRED BRISBOIS.